United States Patent [19]
Guinet

[11] Patent Number: 6,014,002
[45] Date of Patent: Jan. 11, 2000

[54] METHOD FOR POWERING AN ELECTRONICALLY SWITCHED VARIABLE-RELUCTANCE ELECTRIC MOTOR, AND POWER SUPPLY CIRCUIT THEREFOR

[75] Inventor: Michel Guinet, Cambes-en-Plaines, France

[73] Assignee: Moulinex S.A., Paris, France

[21] Appl. No.: 09/117,780

[22] PCT Filed: Jan. 22, 1997

[86] PCT No.: PCT/FR97/00120

§ 371 Date: Aug. 6, 1998

§ 102(e) Date: Aug. 6, 1998

[87] PCT Pub. No.: WO97/29542

PCT Pub. Date: Aug. 14, 1997

[30] Foreign Application Priority Data

Feb. 6, 1996 [FR] France .................................. 96/01385

[51] Int. Cl.[7] .................................................. H02P 7/36
[52] U.S. Cl. ................................... 318/701; 318/254
[58] Field of Search ................................ 318/701, 254, 318/439, 138, 685, 696

[56] References Cited

U.S. PATENT DOCUMENTS

| | | | |
|---|---|---|---|
| 3,639,819 | 2/1972 | Wiart ........................................ | 318/138 |
| 5,166,591 | 11/1992 | Stephens et al. ........................ | 318/701 |
| 5,689,164 | 11/1997 | Hoft et al. ............................... | 318/701 |
| 5,811,954 | 9/1998 | Randall ................................... | 318/254 |
| 5,923,141 | 7/1999 | McHugh ................................. | 318/701 |

FOREIGN PATENT DOCUMENTS 42 39 668   3/1994   Germany .

OTHER PUBLICATIONS

By P.C. Kjaer et al., "A New Energy Optimizing Control Strategy for Switched Reluctance Motors", *1994 IEEE*, vol. 1, pp. 48–55.

By G.H. Rim et al., "A Novel Converter Topology for Switched Reluctance Motor Drives Improving Efficiency and Simplifying Control Strategy", *1994 IEEE*, pp. 937–942.

*Primary Examiner*—Jonathan Salata
*Attorney, Agent, or Firm*—Young & Thompson

[57] ABSTRACT

A method for powering an electronically switched variable reluctance polyphase electric motor from a rectified voltage source, including for each phase, magnetizing sequences during which the rectified voltage is applied to each phase and demagnetizing sequences during which the inverse of the rectified voltage is applied to each phase. The method further includes sensing disturbances in the current from the rectified voltage source and in response thereto, free-wheel sequences during which the magnetic energy currently stored in at least one of the phase is substantially maintained therein.

15 Claims, 5 Drawing Sheets

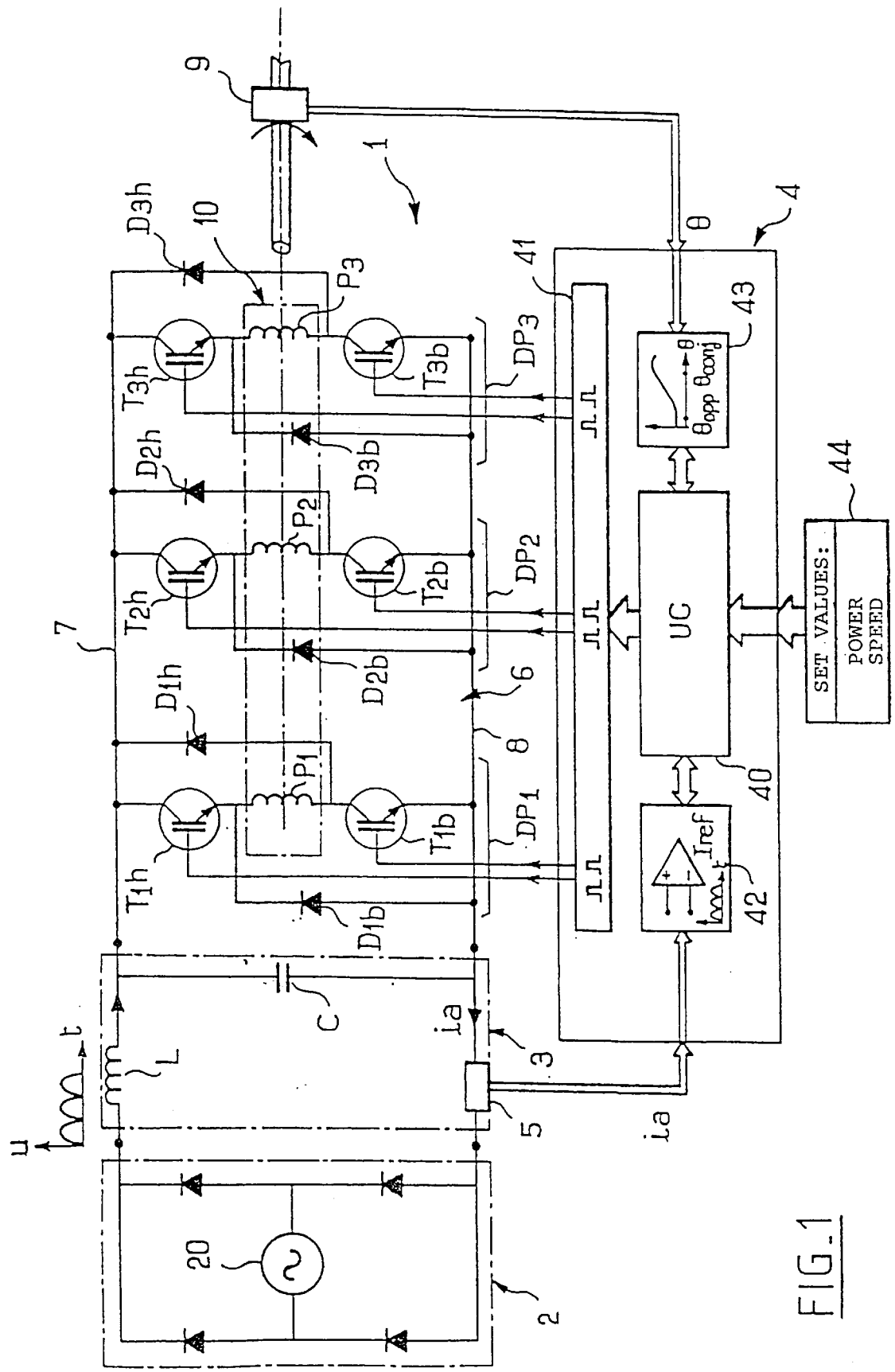
FIG_1

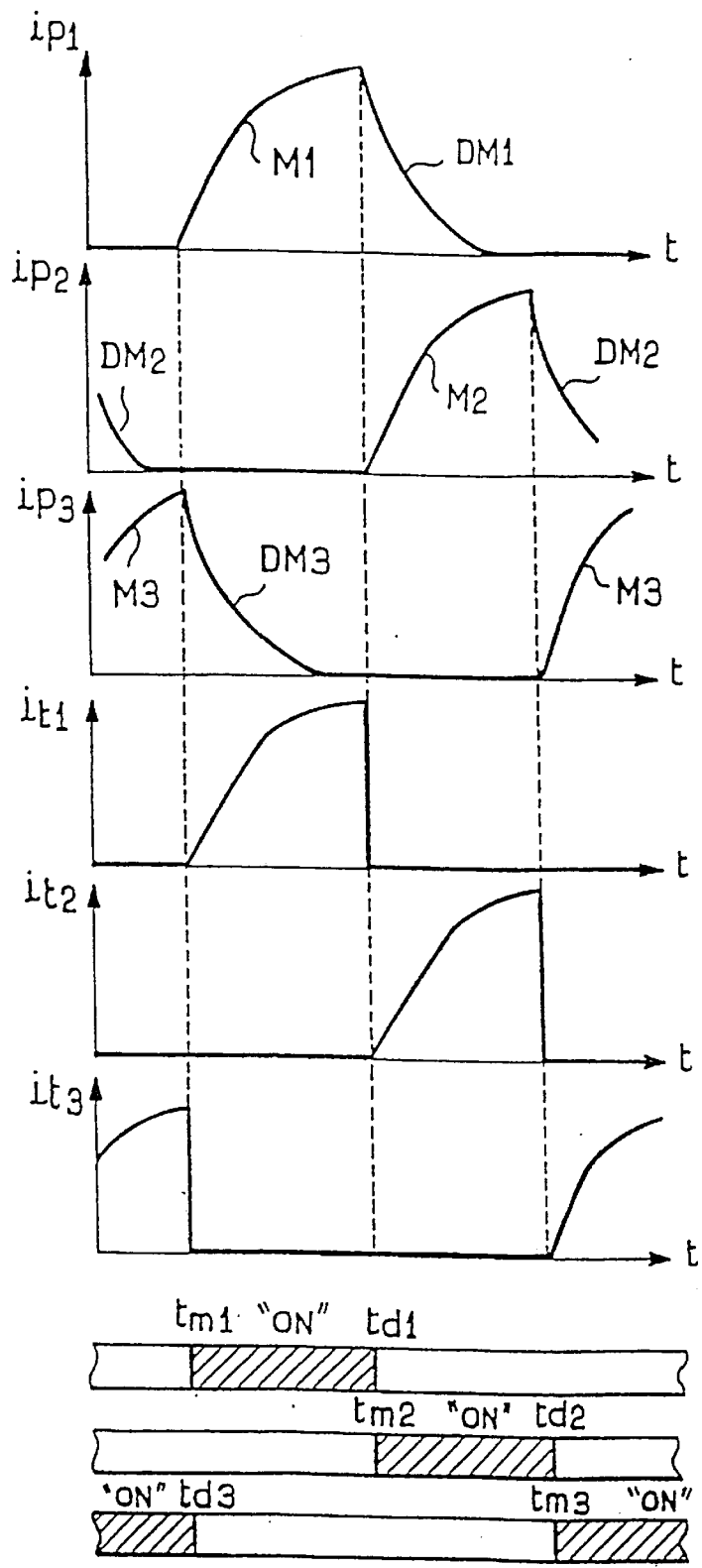
FIG_2

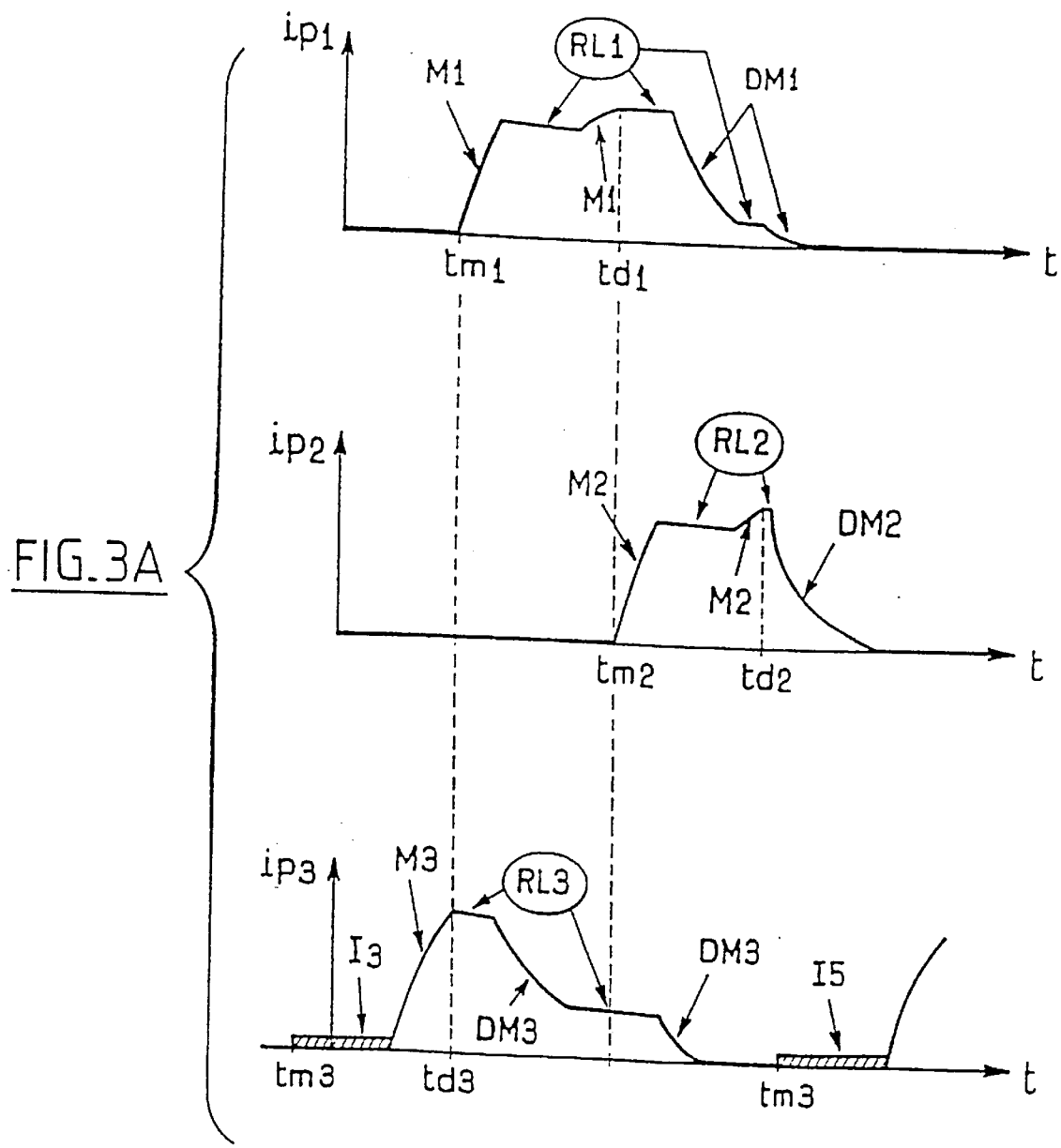

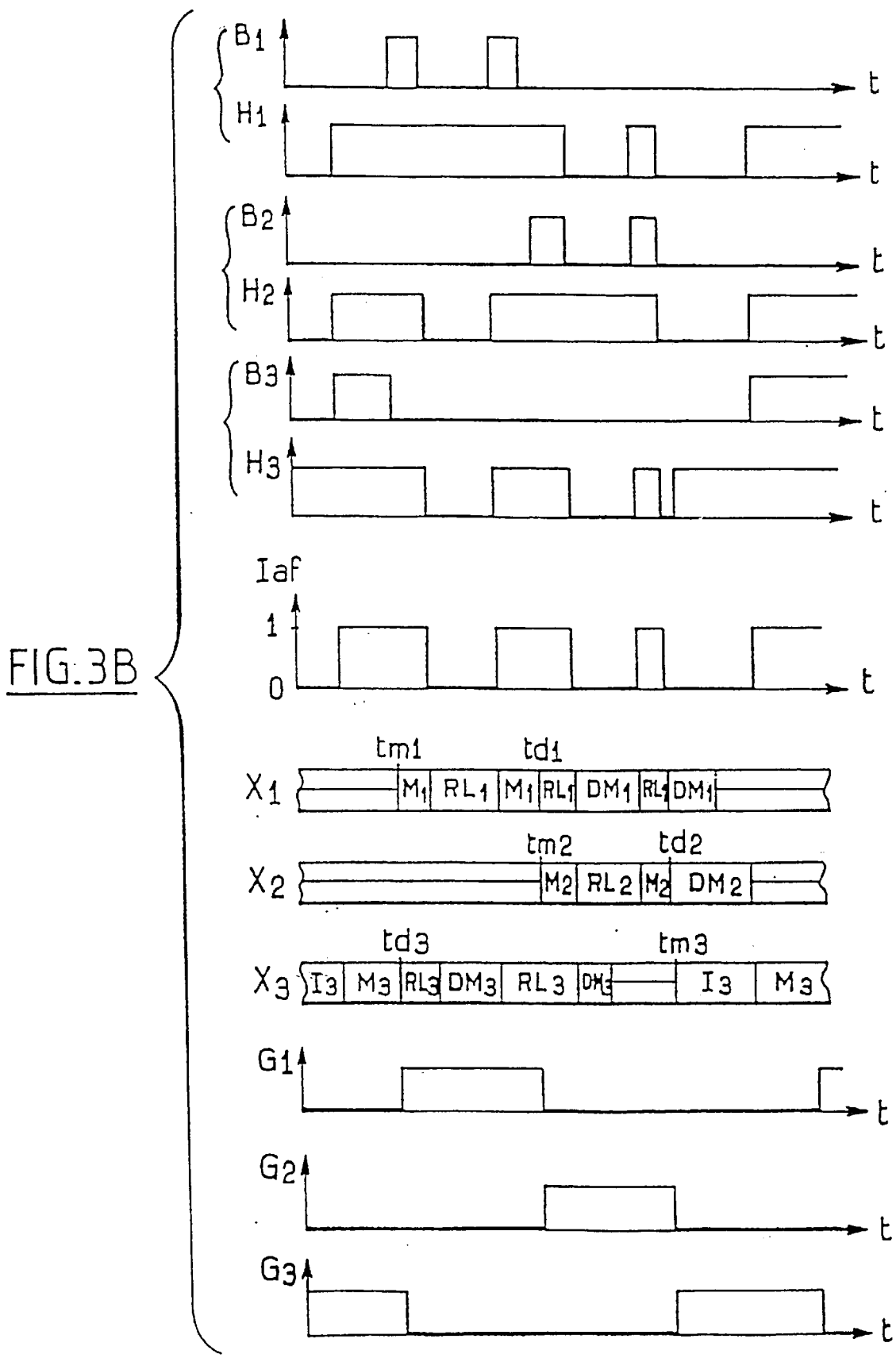

METHOD FOR POWERING AN ELECTRONICALLY SWITCHED VARIABLE-RELUCTANCE ELECTRIC MOTOR, AND POWER SUPPLY CIRCUIT THEREFOR

The present invention relates to a process for supplying an electronically switched variable reluctance electric motor. It also relates to a supply circuit for the same.

The supply of AC current of an electrically switched variable reluctance motor from a monophase network sector generally uses a rectifier stage and a converter stage comprising electronic switching means controlled by set values and data as to position emitted by detectors, to supply the different phases of this motor. The present invention relates more particularly to the case of electronically switched variable reluctance motors supplied by a converter comprising asymmetric half-bridges.

It is noted that in present processes for the supply of electronically switched motors, and particularly in the supply process used in an asymmetric half-bridge converter, the rectified current delivered by the rectifier stage is subjected to disturbances which can be multiples of the frequency of the sector frequency. These disturbances can lead to exceeding the values of current harmonics permitted by the standard CEI 555-2. At present, this problem is solved by filtering the supply current or the current delivered by the rectifier stage so as to eliminate the current harmonics higher than the sector frequency. There is inserted for example a filter, passive (based on filters L, C) or active (of the PFC type: "Power Factor Correction"), between the rectifier stage and the converter stage. However, the addition of highly capacitative filters (for example 1 mH, 470 $\mu$F) leaves remaining the problem of uneven low frequency harmonics. With a weakly capacitative sector filter (1.5 mH, 20 $\mu$F), there are observed harmonics connected to the control frequency. Moreover, the addition of a PFC filter upstream of the converter stage leads to significant and prohibitive increase in cost of the electronics when the power to be controlled exceeds several hundreds of watts.

The object of the invention is to overcome these drawbacks by providing a process for the supply of an electronically switched variable reluctance motor, using magnetization and demagnetization sequences and in which the power transferred in the course of these sequences is eventually used to compensate or eliminate the disturbances in the supply current.

These objects are achieved with a process to supply an electronically switched variable reluctance polyphase electric motor from a source of rectified voltage, comprising for each phase:

magnetization sequences during which the rectified voltage is applied to each phase, and demagnetization sequences during which the inverse of said rectified voltage is applied to each phase.

According to the invention, the process moreover comprises:

detection of the disturbances affecting the current delivered by the source of rectified voltage, and in response to such detection, free wheel sequences during which the magnetic energy then stored in at least one of said phases is substantially maintained in the latter.

There is to be understood more generally by disturbance of the current, any deformation of the current wave relative to a reference current wave, this deformation being adapted to be induced by any physical phenomenon, identified or not, of internal or external origin, to the drive system in question.

As to the difference in the conventional supply processes using asymmetric half-bridges, in which the energy transfers between the source and the phases are conditioned only as to angular parameters (opposition, conjunction and perhaps dephasing) and as to operational and safety set values, in the process according to the invention, these energy transfers can be retarded or inhibited so as to compensate the disturbances detected in the supply current, with the object of observing existing standards of electromagnetic compatibility.

In a preferred embodiment of the process according to the invention, the disturbances affecting the rectified supply current are detected by measuring this current and by comparing it to a reference current wave. But there could also be provided any type of estimation of the rectified supply current, not using an effective measurement of the current.

The process according to the invention preferably comprises the detection, during a magnetization sequence of one phase, a supply current higher than the amplitude of the reference current wave at the instant of detection, this detection leading to an interruption of this magnetization sequence and a free wheeling sequence of this phase.

Moreover, the detection, during a demagnetization sequence of one phase, of a supply current lower than the reference current wave amplitude at the instant of detection, leads to an interruption of this demagnetization sequence and to a free wheeling sequence of this phase.

The detection, during initiation of a magnetization sequence of one phase, of a supply current higher than the amplitude of the reference current wave at the instant of detection, leads to an inhibition of this magnetization sequence until the disturbance of the supply current is compensated.

According to another aspect of the invention, there is proposed a circuit for supplying an electronically switched variable reluctance polyphase electric motor, comprising means to rectify an AC voltage delivered by a source, means to magnetize successively each phase by application of this rectified voltage to said phases, means to demagnetize successively each phase by application of the inverse of this rectified voltage to the phases, and means to control said magnetization and demagnetization means, this circuit using the process according to the invention.

This circuit moreover comprises means to measure the supply current delivered by the rectifying means, and the control means are adapted to detect any disturbance of the supply current and to control the magnetization and demagnetization means so as to correct the disturbances of the rectified supply current.

The control means are preferably adapted to detect any disturbance of the supply current relative to a reference current wave, and the magnetization means are controlled so as to place in free wheel the phase which is in the course of demagnetization when a supply current higher than a reference value is detected.

Moreover, the demagnetization means are controlled so as to place in free wheel the phase which is in the course of demagnetization when a supply current lower than a reference value is detected.

In the case of a circuit comprising asymmetric half-bridges to supply each phase of this motor, each asymmetric half-bridge comprising high switch means and low switch means disposed on opposite sides of each phase and demagnetization diodes to connect the terminals of each phase to the terminals of the rectifying means, the control means are adapted to block the low switches in response to a detection of a supply current higher than a reference value.

The control means are moreover adapted to control in passing mode the high switches in response to a detection of a supply current below a reference value. There could also be provided filter means interposed between the supply and the asymmetric half-bridges.

Other features and advantages of the invention will become apparent from the following description. In the accompanying drawings, given by way of non-limiting examples:

FIG. 1 shows a first example of embodiment of a supply circuit according to the invention;

FIG. 2 is an assembly of chronograms showing the evolution of the currents in the phases and in the switches with a conventional supply process using asymmetric half-bridges; and FIG. 3A shows waveforms of the phase currents in the supply circuit according to the invention shown in FIG. 1;

FIG. 3B shows chronograms of the control signals in the supply circuit according to the invention.

Figure 4:
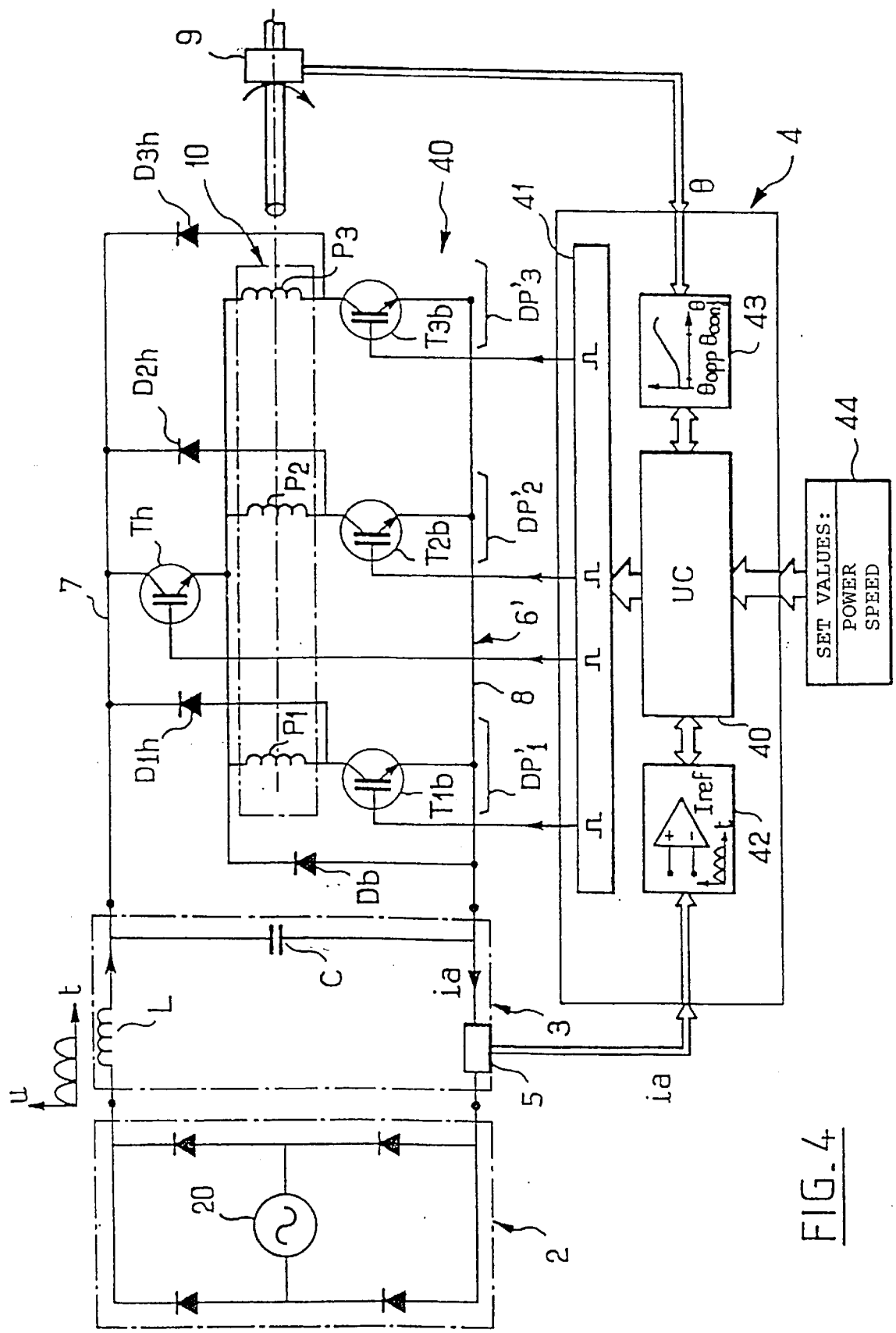
FIG. 4 shows a second embodiment of a supply circuit according to the invention.

There will now be described, with reference to FIG. 1, an embodiment of a supply circuit according to the invention. The circuit 1 comprises a rectifier stage 2, a filter stage 3, a converter stage 6 coupled to three phase windings P1, P2, P3 of an electronically switched variable reluctance motor 10. The rectifier stage 2 has a conventional structure of a diode bridge and is provided to deliver a double alternance rectified voltage u from a monophase AC voltage source 20. The filter stage 3 is of the passive type and comprises a filtering inductance L in series and a filter capacitor C in parallel. It is to be noted that other filter embodiments can be used than those described. For example, the filter inductance could be placed in series with the voltage source.

The converter stage 6 comprises three asymmetric half-bridges DP1, DP2, DP3 each associated with a phase P1, P2, P3 of the motor 10 and all three connected in parallel to the output of the filter stage 3. Each half-bridge DP1–3 comprises conventionally a high switch T1h–T3h whose high terminal is connected to a high supply line 7 of the converter stage 6, a low switch T1b–T3b of which a low terminal is connected to a low supply line 8 of said converter stage 6, a first free wheel diode D1h–D3h having its cathode connected to the high supply line 7 and its anode connected to the high terminal of low switch T1b–T3b, and a second free wheel diode D1b–D3b having its cathode connected to the low terminal of the high switch T1h–T3h and its anode connected to the low supply line 8. The high and low power switches can be, by way of non-limiting example, IGBT transistors (Insulated Gate Bipolar Transistors).

The supply circuit 1 moreover comprises a control device for receiving:

data on the supply current ia delivered by the rectifier stage 2, supplied by a current probe 5, data on the instantaneous angular position θ of the motor rotor, supplied by an angular encoder 9 or any other means for measuring angular position, and set operating data supplied by the user of the equipment provided with this supply circuit, particularly set values of power and speed.

The control device 4 comprises a processing function 42 of the measurement of the supply current ia to determine possible disturbances of this current, a processing function 43 of the angular measurement θ to determine the instance of beginning of the magnetization sequences and of the demagnetization sequences, a function 44 for taking account of the said operating values, a central control and processing unit 40, in the form for example of a microprocessor, and a function 41 for generation of control signals for the high and low switches T1h, T2h, T3h; T1b, T2b, T3b.

The processing function 42 of the supply current comprises for example a comparison of the measured current with a reference current wave Iref in the form of a double alternating rectified sinusoidal wave. There could also be provided a sampling of the rectified voltage and the processing of this voltage measurement to extract from it an image of the reference current wave.

The function of angular processing comprises for example a comparison of the measurement of the instantaneous angle θ with angles characteristic of a variable reluctance motor, particularly θopp (opposition) and θconj (conjunction). This function could also include computations of the angle of advance or retard of magnetization and/or demagnetization, as a function particularly of the motor speed.

There will now be described the operation of the supply process, considering first the essential sequences of the conventional supply processes using asymmetric half-bridges, then by explaining the sequences characteristic of free-wheeling and of inhibition using the process according to the invention.

In a conventional supply process for a variable reluctance motor with asymmetric half-bridges, each energy transfer toward one phase in the course of magnetization is accompanied necessarily by a supplemental draw on the supply whilst each energy return from a phase in the course of demagnetization toward the supply is necessarily accompanied by an input of current of a sign opposite to the supply current. Each magnetization sequence of one phase comprises a transfer of energy from the source and/or from at least one phase in the course of demagnetization, to the phase in the course of magnetization, and each demagnetization sequence comprises a transfer of energy from the phase in the course of demagnetization to the rectified voltage source and/or to at least one phase in the course of magnetization.

As shown in FIG. 2 in the case of a triphase variable reluctance motor, the phase currents $i_{p1}$, $i_{p2}$, $i_{p3}$ have waveforms comprising, for each electrical period, an increasing portion corresponding to a magnetization sequence M1, M2, M3, followed by a decreasing portion corresponding to a demagnetization sequence DM1, DM2, DM3. The magnetization sequences begin at instance tm1, tm2, tm3 and end at instance td1, td2, td3, the instance of beginning and ending being determined by a control device, from data as to angular position of the rotor of the motor and of set control values. During these magnetization sequences, the two switches of one half-bridge are passing ("on") and the current $i_{t1}$, $i_{t2}$, $i_{t3}$ flowing then in these switches corresponds to the increasing portion of the current $i_{p1}$, $i_{p2}$, $i_{p3}$ inserted in the phase in question P1, P2, P3.

The rectified supply current delivered by the filter stage is equal to the difference between, on the one hand, the sum of the currents required by the switches of the half-bridges during the magnetization sequences and, on the other hand, the sum of the current returned via the free wheel diodes during the demagnetization sequences. In terms of energy, the energy transferred in one phase in the course of a magnetization sequence comes on the one hand from the rectified voltage source, and on the other hand from the phase in the course of demagnetization. Any variation of energy from the source or transferred to the latter shows up as a variation of rectified current delivered by this source. The supply process according to the invention therefore tends to regulate the energy transfers between the source and the converter as a function of the supply current if that is effectively delivered.

This supply current ia is measured and compared to a reference current wave, for example a homothetic current wave of the double alternance rectified voltage wave.

There will now be considered the following quantities and variables, with reference to FIGS. 3A and 3B:

$i_{p1}$, $i_{p2}$, $i_{p3}$: currents in the phases of the motor,

B1, B2, B3: control signals of the low switches of the asymmetric half-bridges,

H2, H2, H3: control signals of the high switches of the asymmetric half-bridges, Iaf: variable logic indicative of the level of the supply current; this variable is calculated from the processing of the measurement of the supply current:

Iaf=1 when the supply current is below a reference value,

Iaf=0 when the supply current is greater than or equal to this reference value;

X1, X2, X3: functions of the energetic condition of each motor phase; and

G1, G2, G3: logic variables corresponding to the time windows of magnetization.

In a preferred embodiment of the supply process according to the invention, the control signals of the low and high switches are governed by the following logic expressions:

$$Bi=Iaf \cdot Gi$$

$$Hi=Iaf+Gi$$

wherein i=1, 2, 3

But other logic expressions can be used to determine the control signals of the supply circuit. Thus, there could also be used the following logic expressions:

$$Bi=Gi$$

$$Hi=Iaf$$

wherein i=1, 2, 3

There will first be considered the motor phase indexed 1. At an instant $t_{m1}$ determined by the control device 4, A magnetization sequence M1 of the phase 1 is undertaken and pursued until the logic variable Iaf is at the logic level 1 ("weak" current). When the variable Iaf drops to the logic level 0 ("high" current), the sequence of magnetization is interrupted by blocking the low switch T1b and is followed by a free wheel sequence RL1 in the course of which the high switch T1h is maintained passing and the diode D1h becomes conductive. In the course of a free wheel sequence which is initiated in response to a detection of an "excess" of current, the current flowing in the phase in question is no longer drawn to the supply level and the supply current is correspondingly diminished, which contributes to reducing the excess of current previously detected. As soon as the logic variable of current Iaf resumes the logic level 1 (weak current), there is followed a magnetization sequence M1 until an instant $t_{d1}$ is reached, of demagnetization determined by the control device 4. Because the logic variable of current Iaf is again at logic level 1, there is again a free wheel sequence RL1 which is executed, and not a demagnetization sequence, so as not to aggravate the "deficit" of supply current by re-sending toward the source of demagnetization current. As soon as the logic variable of current Iaf resumes level 0, the awaited demagnetization sequence DM1 is undertaken. A transition of the logic variable of current Iaf from level 0 to level 1 gives rise to the passage to a new free wheel sequence RL1 which is followed, upon return of the logic variable Iaf to level 0, by a final demagnetization sequence until the current is annulled in the phase P1 in question. Thus, over an electrical period, the various sequences of free wheeling have each for its function to reduce the disturbances of the rectified supply current, either by neutralizing the current draw in a phase in the course of one sequence of magnetization (high current), or by neutralizing the current return from a phase (weak current).

As to the supply of the phase P2 of the motor, a magnetization sequence M2 is undertaken at an instant $t_{m2}$ determined by the control device 4 as a function of angular position data delivered by the detector 9. This magnetization sequence M2 is interrupted when the logic variable of current Iaf shifts from the logic level 1 to the logic level 0 (high current). A free wheel sequence RL2 is then undertaken until the logic variable of current Iaf again reaches the logic level 1 (weak current) and leads to a new magnetization sequence up to an instant $t_{d2}$ of demagnetization control. A demagnetization sequence Dm2 is then undertaken until the current $i_{p2}$ in the phase P2 in question is annulled.

Let us now study the case of supply of the third phase P3 in the particular case shown by the temporal evolution of the logic variable of current Iaf. At an instant $t_{m3}$ at the beginning of magnetization determined by the control device 4, the logic variable of current Iaf is at logic level 0 (high current), and as a result there is caused a free wheel sequence (I3) with zero current retarding the magnetization sequence until the logic variable of current Iaf reaches logic level 1 (weak current). This means that as long as the supply current is considered as too high, a magnetization sequence cannot be undertaken which would inevitably have for its result, by giving rise to a new current draw, aggravating the excess of drawn current. After this inhibition sequence I3, a magnetization sequence M3 is undertaken until an instant of demagnetization td3 is reached, determined by the control device 4. As the current is again considered as too low (Iaf=1), the demagnetization sequence normally reached is neutralized and replaced by a free wheeled sequence (RL3) until the logic variable of current Iaf reaches the logic level 0 (high current). There will then be undertaken a demagnetization sequence DM3 until the logic variable of current Iaf again reaches the logic level 1 (weak current) with the result of giving rise to a new free wheel sequence RL3. A new return of the logic variable of current Iaf leads finally to a final demagnetization sequence Dm3 until the current in the phase P3 is annulled.

It should be noted that the description which has been given relates only to a very particular example of operation and that the three phases can have any energy conditions independently of their respective ranks. Moreover, the resulting waveforms of the phase currents can be very different from those described and can correspond to other combinations of sequences. Furthermore, the control strategy can be modified to include for example simultaneous magnetization states of several phases.

The present invention can also be applied to a second supply circuit structure comprising only a single high switch common to all the motor phases, as shown in FIG. 4, in which the elements common to FIG. 3 have the same reference numerals.

The supply circuit 40 comprises a converter stage 6' constituted by three switching arms DP'1, DP'2, DP'3 each comprising a low switch T1b, T2b, T3b disposed between a first terminal of a phase P1, P2, P3 of the motor 10 and the low supply line 8, and a free wheel diode D1h, D2h, D3h disposed between the second terminal of the phase in question P1, P2, P3 and the high supply line 7. A high common switch Th is disposed between the high supply line 7 and the common connection bridge of the three other terminals of the phases P1, P2, P3. The magnetization sequences of each phase correspond to a concomitant control of the high switch Th and of the low switch T1b, T2b, T3b in question. The demagnetization sequences of each phase correspond to a blockage of the corresponding low switch T1b, T2b, T3b and/or of the common high switch Th. Free wheel sequences of each phase can be undertaken either by controlling in the passing mode at least one of the low switches T1b, T2b, T3b whilst the high switch Th is blocked, or by controlling in passing mode the high switch Th while the low switches T1b, T2b, T3b are blocked. With reference to the control logic signals G1, G2, G3 and to the logic variable of current Iaf shown in FIG. 3B, the control signals B1, B2, B3 of the low switches T1b, T2b, T3b and the control signal H of the high switch Th, can be expressed in the following manner:

$$Bi=Gi$$

wherein i=1, 2, 3

$$H=Iaf$$

There can also be provided another control mode comprising, in response to the detection of a disturbance of the supply current, magnetization/free wheel actions and/or demagnetization/free wheel actions with variable cyclic ratios as a function of the level of disturbance of the supply current. These variable cyclic ratios can for example be modulated proportionally to the level of disturbance detected. It is then a question of more than one detection of "all or nothing" type for disturbances of the supply current, but rather of a measurement of the level of disturbances from which the cyclic ratios of the magnetization/free wheel actions and demagnetization/free wheel actions are determined.

Of course, the invention is not limited to the examples which have been described and numerous arrangements can be given to these examples without departing from the scope of the invention. Thus, the number of phases and pairs of poles of the variable reluctance motor supplied by this process can be any desired. Moreover, the process according to the invention can operate according to all usual laws of adjustment of the beginning angles of the sequences of magnetization and demagnetization. The choice of power switches is not limited to IGBT transistors suggested in the description but can include any other transistor technology.

Moreover, the control logic of the high and low switches can of course be changed.

I claim:

1. Process to supply an electronically switch variable reluctance polyphase electric motor (10) from a rectified voltage source (2), comprising for each phase (P1–3) of this motor (10):
    magnetization sequences (M1–3) during which the rectified voltage is applied to said phase (P1–3), demagnetization sequences (DM1–3) during which the inverse of said rectified voltage is applied to said phase (P1–3), characterized in that it moreover comprises:
        a detection of disturbances effecting the current (ia) delivered by the rectified voltage source (2),
        and in response to such detection, free wheel sequences (RL1–3) during which the magnetic energy then stored in at least one of said phases (P1–3) is substantially maintained in the latter.

2. Process according to claim 1, characterized in that disturbances affecting the rectified supply current (ia) are detected by measuring this current and comparing it to a reference current wave.

3. Process according to claim 1, characterized in that the detection, during a magnetization sequence (M1–3) of a phase (P1–3), of a supply current higher than a current reference value at the instant of detection, leads to interruption of this magnetization sequence (M1–3) and to a free wheel sequence (RL1–3) of this phase (P1–3).

4. Process according to claim 1, characterized in that the detection, during a demagnetization sequence (DM1–3) of a phase (P1–3), of a supply current below a reference current value at the instant of detection, leads to an interruption of this demagnetization sequence (DM1–3) and to a free wheel sequence (RL1–3) of this phase (P1–3).

5. Process according to claim 1, characterized in that the detection, during initiation of a magnetization sequence (M3) of a phase (P3), of a supply current higher than a reference current value at the instant of detection, leads to a free wheel sequence I3) inhibiting this magnetization sequence (M3) until the disturbance of the supply current is compensated.

6. Process according to claim 1, characterized in that the control means are moreover adapted to control the conditions of magnetization simultaneously, of several phases of the motor.

7. Process according to claim 1, characterized in that the control means are moreover adapted to control for each phase, in response to the detection of a disturbance of the supply current, the magnetization/free wheel actions and/or the demagnetization/free wheel actions with variable cyclic ratios as a function of the level of disturbance of the supply current.

8. Process according to claim 7, characterized in that the cyclic ratios of the magnetization/free wheel actions and of the demagnetization/free wheel actions are modulated proportionally to the level of the disturbance detected.

9. Circuit to supply an electronically switched variable reluctance polyphase electric motor (10), comprising means (2) to rectify an AC voltage delivered from a source (20), means (T1h, T1b, T2h, T2b, T3h, T3b; Th) to magnetize successively each phase (P1–3) by successive application of this rectified voltage to these phases (P1–3), means (D1h, D1b, D2h, D2b, D3h, D3b; Db) to demagnetize successively each phase (P1–3) by successive application of the inverse of this rectified voltage to these phases (P1–3), and means (4) to control said magnetization and demagnetization means, this circuit using the process according to claim 1, characterized in that it comprises moreover means (5) to measure the supply current (ia) delivered by the rectifying means (2), and in that the control means (4) are adapted to detect any disturbance of the rectified supply current (ia) and to control the magnetization and demagnetization means so as to correct the disturbances.

10. Circuit according to claim 9, characterized in that the control means (4) are adapted to detect any disturbance of the supply current (ia) relative to a reference current wave (Iref), and in that the magnetization means (T1h, T1b, T2h, T2b, T3h, T3b; Th) are controlled to place in free wheel (RL1–3) the phase (P1–3) in the course of magnetization when a supply current higher than a reference value is detected.

11. Circuit according to claim 10, characterized in that the magnetization and demagnetization means are controlled to place in free wheel (RL1–3) the phase (P1–3) in the course of demagnetization when a supply current below a reference value is detected.

12. Circuit according to claim 9, comprising, as the magnetization and demagnetization means, asymmetric half-bridges (DP1–3) to supply each phase (P1–3) of the motor (10), each asymmetric half-bridge (DP1–3) comprising high switching means (T1h, T2h, T3h) and low switching means (T1b, T2b, T3b) disposed on opposite sides of each phase (P1–3) and demagnetization diodes (D1h, D2h, D3h; D1b, D2b, D3b) to connect the terminals of each phase (P1–3) to the terminals of the rectifying means (2), characterized in that the control means (4) are adapted to block the low switches (T1b, T2b, T3b) in response to the detection of a supply current (ia) greater than a reference value.

13. Circuit according to claim 9, comprising, as the magnetization and demagnetization means, switching arms (DP'1–3) to supply each phase (P1–3) of the motor (10), high switching means (Th) disposed between a high supply line (7) and a common connection point of the respective second terminals of each phase (P1, P2, P3), and a common free wheel diode (Db) having its cathode connected to said common point and its anode connected to a low supply line (8), each switching arm (DP'1–3) comprising low switching means (T1b, T2b, T3b) disposed between the low supply line (8) and a first terminal of a phase (P1–3) and a free wheel diode (D1h, D2h, D3h) having its anode connected to this first terminal and its cathode connected to the high supply line (7), characterized in that the control means (4) are adapted to block the low switches (T1b, T2b, T3b) in response to a detection of a supply current (ia) greater than a reference value.

14. Circuit according to claim 12, characterized in that the control means (4) are moreover adapted to control in passing mode the high switching means (T1h, T2h, T3h; Th) in response to a detection of a supply current (ia) below a reference value.

15. Circuit according to claim 12, characterized in that it comprises moreover filtering means (3) interposed between the supply and the converter stage (6, 6').

* * * * *